June 14, 1932.  H. RABEZZANA  1,862,981
EQUATORIALLY SEALED SPARK PLUG AND METHOD OF MAKING THE SAME
Filed Dec. 21, 1928
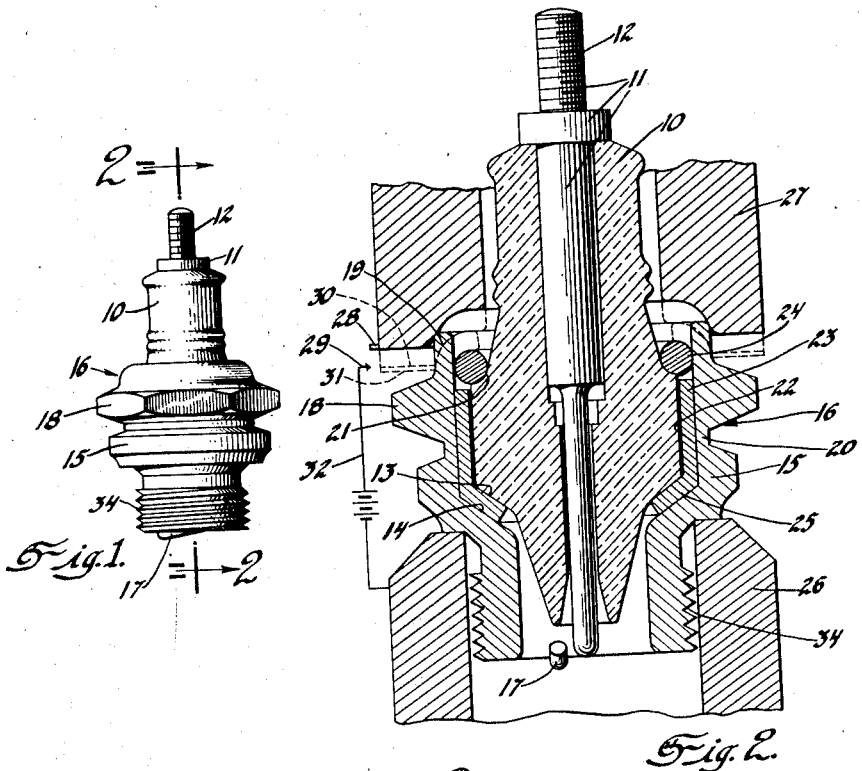
Fig. 1.
Fig. 2.
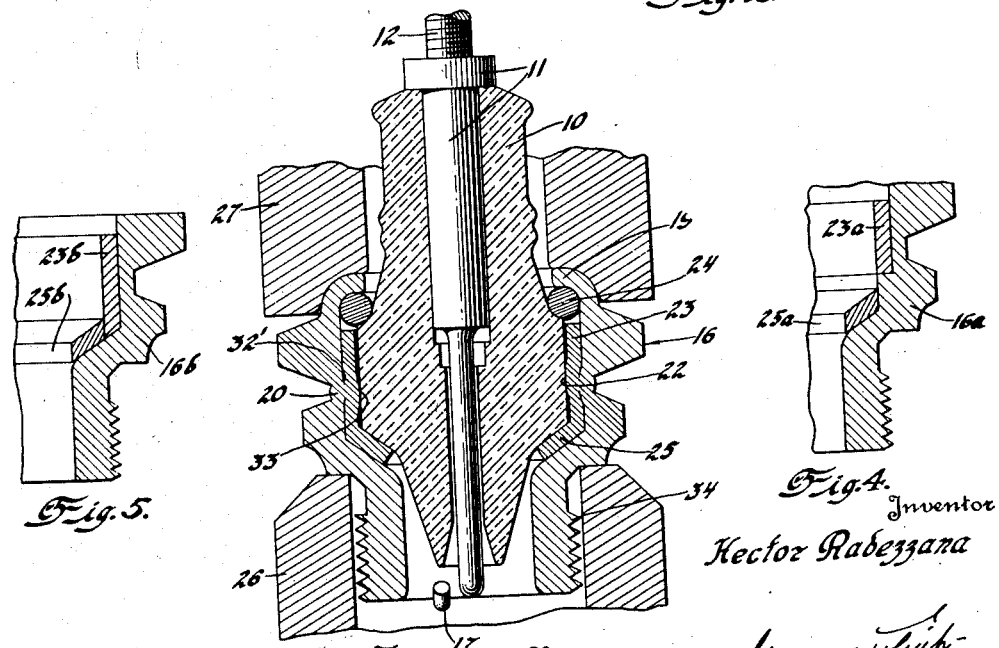
Fig. 5.
Fig. 3.
Fig. 4.
Inventor
Hector Rabezzana
By Blackmore, Spencer & Hulse
Attorneys Patented June 14, 1932

1,862,981

UNITED STATES PATENT OFFICE

HECTOR RABEZZANA, OF FLINT, MICHIGAN, ASSIGNOR TO A C SPARK PLUG COM-
PANY, OF FLINT, MICHIGAN, A CORPORATION OF MICHIGAN

EQUATORIALLY SEALED SPARK PLUG AND METHOD OF MAKING THE SAME

Application filed December 21, 1928. Serial No. 327,550.

The use of a final thermo-plastic collapse of a reduced section zone, provided in a conductive shell, to secure and maintain a desired longitudinal compression, (for a sealing effect between said shell and a porcelain or similar insulator held between a shoulder and an internal lip, initially provided upon said shell) was described and claimed in my Patent 1,609,735, granted December 7, 1926; and it is an object of the present invention, constituting an improvement thereon, to provide such parts and such a method as shall render the thermo-plastic collapse of such a zone for the mentioned purposes, or any inward collapse of a suitably reduced and positioned zone, effective to provide a substantially gas-tight joint between a conductive shell and a main intermediate part of a vitreous or similar insulation upon which said shell may be shrunk.

This invention is based upon the discovery that even in the case of a porcelain-type insulation the collapse of a reduced-section intermediate zone may be so executed as to effect a leak-tight joint thereat; and it is an object of this invention, preferably surrounding a cylindrical or similar intermediate portion of a porcelain insulator, or the like, with a peripheral gasket, formed of a gas-impervious but deformable material, to so execute the inward deformation of a metallic shell as substantially to obviate risk of damage to the insulator therein while nevertheless providing such a marked equatorial construction upon cooling, as to prevent leakage and/or early deterioration of the spark plug comprising the same.

Other objects of this invention, in all forms of which the mentioned shell may comprise sections which are spaced apart by the mentioned reduced section or weakened zone and in which the mentioned peripheral gasket element may be formed integral with a skirt or extension which is adapted to function as an additional gasket interposed between shoulders respectively provided by the mentioned insulator and by the mentioned shell, and in which an annular and lip-receiving gasket distinct from mentioned gaskets, may be interposed between an outer shoulder provided upon the insulator and a peripheral flange or lip provided upon an upper or outer section of the mentioned shell and suitable for a cold deformation, may be best appreciated from the following description of an illustrative embodiment of said invention, taken in connection with the appended claims and the accompanying drawing.

Fig. 1 is a small-scale elevational view, showing only the external appearance of one embodiment of the present invention.

Fig. 2 is a vertical or longitudinal sectional view which may be regarded as taken in the plane 2—2 of Fig. 1,—this view showing parts assembled between opposing dies, but not yet compressed.

Fig. 3 is a view taken similarly to Fig. 1 but showing, somewhat diagrammatically, the results of a compression or thermo-plastic collapse of certain parts illustrated in Fig. 2.

Figs. 4 and 5 show modified forms of my invention.

Referring to the details of that specific embodiment of the present invention chosen for purposes of illustration, a porcelain or other vitreous or cast insulator, such as the one-piece insulator 10 is shown as provided with a substantially central inner electrode 11, extending longitudinally therethrough and provided with a threaded terminal 12; and said insulator is shown as comprising a lower shoulder 13, disposed opposite a cooperating shoulder 14 which is provided within a lower and thread-carrying section 15 of a shell 16. Shell 16 shown as carrying a substantially horizontal electrode 17; and an upper or outer section 18 of said shell is shown as non-circular in outline, to adapt to receive a wrench, and as including also an upstanding flange or lip 19,—a reduced section equatorial zone 20 of said shell being so shaped and so interposed between the sections 15 and 18 as to adapt said zone to undergo an inward thermo-plastic collapse, subsequently to a deformation of the lip 19, or its equivalent, by any means to create a longitudinal compressive effect between (a) shoulders 13, 14 and between (b) the lip 19, when inwardly deformed, and an opposing shoulder 21; or a corresponding effect upon interposed gasket or gaskets, if any.

It being, as above indicated, an object of the present invention to provide a leak-preventing constriction between the reduced section equatorial zone 20 of shell 16 and an oppositely-disposed cylindrical or other intermediate portion 22 of the insulator 10, in order substantially to obviate risk of damage to said insulator during an inward deformation of said zone, a deformable gasket element 23 is shown as interposed; and said gasket element may be integral with either a lip-receiving gasket element 24, shown as seated upon the shoulder 21 and as substantially circular in cross-section, or (and preferably) with an inner gasket 25,—the latter being shown as a conical skirt or extension of the peripheral gasket 23.

It will be obvious that, assuming the mentioned parts initially to have substantially the forms shown in Fig. 2, an element comprising gaskets 23 and 25 may be inserted in the shell 16 in advance of the insulator 10 and lip-receiving gasket 24, if used, being disposed between shoulder 21 and lip 19 before said lip is inwardly deformed. Without heating, a movement of approach beween cooperating elements such as dies 26 and 27 may thereupon inwardly deform the lip 19, or its equivalent, in such manner as to hold the mentioned parts firmly assembled; and a subsequent second slight and preferably continuous additional movement of approach therebetween during a suitable heating of the reduced section zone 20, may be relied upon to produce or assure a plurality of gastight joints between the insulator 10 and the surrounding metallic element or elements,— a marked inward collapse being effected in the weakened zone 20 and a slight deformation being preferably incidentally effected in the gasket 25 and/or the gasket 24.

In the diagrammatic illustration constituting Fig. 2, the upper die element 27 is assumed to be movable relatively to the die 26, assumed to be stationary; and the former is shown as provided not only with a lip-deforming shoulder but with a contact projection 28, so formed and disposed as to be engaged by a cooperating contact 29, or the like, as die 27 descends to an intermediate position such as that suggested by the dotted line 30; and a further advance of said die element, to a position such as is suggested by an additional dotted line 31, may serve not only to break the electrical heating circuit 32, but incidentally to discontinue through any desired mechanism (not shown) the descent of the die 27. The die 26 may be adapted to yield, but to maintain pressure upon the plug during a prompt cooling of zone 20, as suggested in Fig. 3. The result of the described operations may be such an inward deformation of the lip 19 as not only to produce a longitudinal compression between mentioned pairs of opposed shoulders but incidentally to compress and/or slightly deform the gasket 24 and/or the gasket 25; but the most essential novelty herein will be understood to be such an inward deformation of a weakened zone, such as the reduced section zone 20, as to produce an equatorial constriction about a so-called one-piece porcelain type insulator or the like in the general manner indicated in Fig. 3; an inwardly extending bead 32′, from the material of the shell 16, or an incidentally constricted region 33 of the peripheral gasket 23 being pressed into such intimate and close-fitting contact with the intermediate zone 22 of insulator 10 as to obviate leakage between the mentioned parts.

In short, I have discovered that, even though a welding effect be momentarily produced between the shell 16 and the peripheral gasket 23, in case the latter is used, the mentioned heating may be so brief, when combined with a self-limited application of pressure, and the conduction away from zone 20 may be so prompt, as substantially to obviate harm to insulator 10 or its equivalent; and that subsequent contraction of the mentioned metallic parts upon cooling may be relied to increase the tightness and durability of the mentioned joints. The mentioned gaskets may advantageously be formed with or without incorporation of asbestos in a known manner, of a metal or metals which, although capable of a deformation sufficient to obviate danger of harm to the insulator 10, as a result of hardening and shrinking the shell 16 thereon, and sufficient to assure exact conformity to said insulator, may nevertheless be sufficiently hard to obviate risk of deterioration as a result of high pressure, high temperature and/or rough usage. To assure tightness upon heating, the coefficient of expansion of the metal or metals used in any or all of the gaskets 23, 24, 25 may be greater than that of the shell 16; and instead of being directly provided with cylinder-engaging threads 34, an inner shell element collapsed in the described manner obviously might be removably or otherwise secured within an outer shell element carrying such threads.

Alternative constructions in which non-contacting gaskets 23a and 25a are separately supported in a shell 16a, and in which separate gaskets 23b and 25b slightly overlap in a shell 16b are suggested in Figs. 4 and 5.

Although the foregoing description mentions but a limited number of embodiments of the present invention, it should be understood not only that various features thereof might be independently employed but also that numerous modifications thereof might easily be devised,—all without departure from the spirit and scope of said invention.

I claim:

1. A spark plug comprising a one-piece insulator providing shoulders which are spaced apart by an intermediate main portion; and a conductive shell providing an inner section and an outer section respectively opposite said shoulders and having therebetween a reduced-section zone which is so collapsed as to provide a gas-tight joint between said zone and said insulator,—a deformable gasket element being interposed between said insulator and said shell and inwardly deformed opposite said zone.

2. A spark plug comprising a one-piece insulator providing shoulders, which are spaced apart by an intermediate main portion; and a conductive shell providing an inner section and an outer section respectively opposite said shoulders and having therebetween a reduced-section zone which is so collapsed as to provide a gas-tight joint between said zone and said main portion,—a deformable gasket being interposed between said insulator and said shell and inwardly deformed opposite said zone, and an additional gasket element being compressed between one of the mentioned shoulders and a shoulder provided within said shell.

3. A spark plug comprising a one-piece insulator providing shoulders which are spaced apart by an intermediate main portion; and a conductive shell providing an inner section and an outer section respectively opposite said shoulders and having therebetween a reduced-section zone which is so collapsed as to provide a gas-tight joint between said zone and said main portion,—a deformable gasket being interposed between said insulator and said shell and inwardly deformed opposite said zone, and an additional gasket in the form of a skirt integral with said deformable gasket being compressed between shoulders respectively provided on said insulator and within said shell.

4. A spark plug comprising a one-piece insulator providing shoulders which are spaced apart by an intermediate main portion; and a conductive shell providing an inner section and an outer section respectively opposite said shoulders and having therebetween a reduced-section zone which is so collapsed as to provide a gas-tight joint between said zone and said main portion,—a deformable gasket being interposed between said insulator and said shell and inwardly deformed opposite said zone and an additional gasket element being interposed between a shoulder provided upon said insulator and a deformed lip provided upon said shell.

5. In a spark plug, a vitreous insulator providing oppositely-disposed shoulders having a substantially cylindrical intermediate part therebetween; and a conductive shell providing not only parts which respectively engage said shoulders but an intermediate and inwardly collapsed reduced-section zone preventing leakage past said intermediate part.

6. In a spark plug, a vitreous insulator providing oppositely disposed shoulders having a substantially cylindrical intermediate part therebetween; and a conductive shell providing not only parts which respectively engage said shoulders, but an intermediate and inwardly collapsed reduced section zone, preventing leakage past said intermediate part, a gasket being interposed opposite said zone.

7. A method of providing a tight joint between a vitreous insulator and a conductive shell receiving the same which comprises providing said shell with a reduced section zone opposite an intermediate part of the contained insulator; inserting a bushing and the insulator successively in said shell; locking said insulator in said shell; and thereafter so collapsing said reduced section zone as to apply radial compression to said insulator therethrough.

In testimony whereof I affix my signature.
HECTOR RABEZZANA.